United States Patent Office 3,715,165
Patented Feb. 6, 1973

3,715,165
INVESTIGATING THE TOPOGRAPHY OF
REFLECTING SURFACES
Francis Hughes Smith, York, England, assignor to Vickers Limited, Millbank, London, England
Filed June 7, 1971, Ser. No. 150,655
Claims priority, application Great Britain, June 9, 1970, 27,976/70
Int. Cl. G01b 11/30, 11/00
U.S. Cl. 356—120    20 Claims

ABSTRACT OF THE DISCLOSURE

A specimen surface is investigated with an optical arrangement that brings a pencil of light to a point focus which oscillates longitudinally about the surface. In dependence upon light reflected from the surface, photoelectronic means provide an electrical signal controlling displacement of a reflecting surface of the arrangement to bring the mean position about which the focus oscillates towards coincidence with the surface.

---

Figure 1:
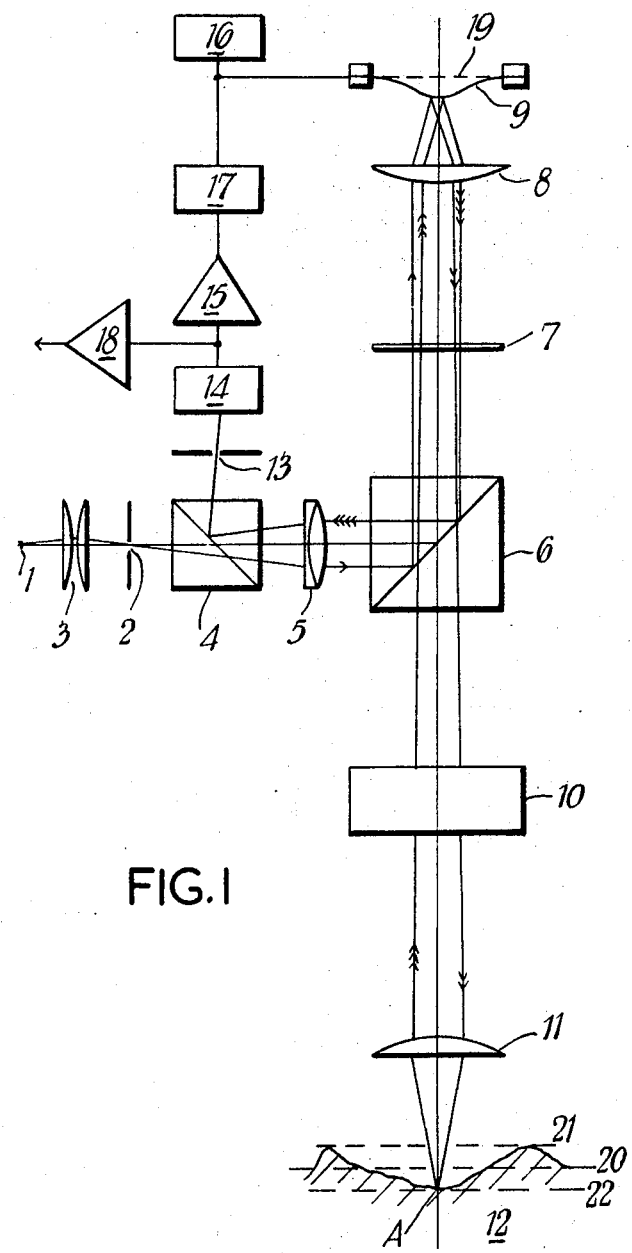

This invention relates to appparatus for investigating the topography of reflecting surfaces.

If an image of a machined or lapped metallic surface of a mechanical component is formed, the image may be optically modified in such a manner that surface undulations are revealed, and by this means the surface finish of the component may be inspected. The optical modification of the image may be brought about by superimposing interference fringes upon the image. However, surface undulations having depth excursions exceeding the depth of focus of the optical system cannot be correctly delineated. Attempts to increase the depth of focus by reducing the system's numerical aperture involve losses of lateral resolution and so impair the fidelity of the delineation.

If a stylus is drawn across the surface under test and the excursions of the stylus are sensed by electrical means, the fidelity of the delineation is impaired by the necessarily finite radius of the stylus "point." The point also tends to penetrate the surfaces of soft material. The surfaces of some components may be too small or too inaccessible for a stylus method to be used.

It is the object of the invention to provide an apparatus for topographical investigation of reflecting surfaces which avoids such difficulties.

According to the present invention, there is provided apparatus for investigating the topography of a reflecting surface, comprising (a) optical means, defining an optical axis, for directing a pencil of light along said optical axis onto an element of said reflecting surface, said optical means including an intermediate objective for coverging said light pencil to an intermediate point focus, reflector means providing a reflecting surface disposed in the vicinity of said intermediate point focus, and controllably displaceable along said optical axis, to reflect said pencil back through said intermediate objective, and a principal objective disposed to receive the pencil from the intermediate objective, after reflection from the reflecting surface of said reflector means, and bring it to a second point focus in the vicinity of said optical element; (b) modulation means connected controllingly with said optical means and operable to bring about dioptrically a cyclic variation of the state of vergence of said pencil, at a position upstream of said principal objective, to cause said second point focus to oscillate along said optical axis about a mean position thereon; and (c) photoelectronic means including a photodetector, mounted to receive said light, after reflection back from said element through said principal objective, for providing an electrical output in dependence upon the amount of said light received by the photodetector, and electrical servo-control means, connected between said photodetector and said reflector means, for operating in dependence upon said electrical output to provide an electrical signal which controls displacement of the reflecting surface of said reflector means to bring said mean position towards coincidence with said element.

The invention may be used not only with visible light but also with non-visible ultra-violet and infra-red light. The range of wavelengths which can be used depends upon the range of wavelengths to which photodetectors can be constructed to be sensitive.

The servo-control means may for example include an electronic gate which opens upon peaking in the output from the photodetector, thereby allowing the transmission of a pulse to a suitable display system. As the pencil is scanned over the surface of the specimen a continuous train of pulses is accordingly produced which can be processed to delineate the surface.

Figure 2:
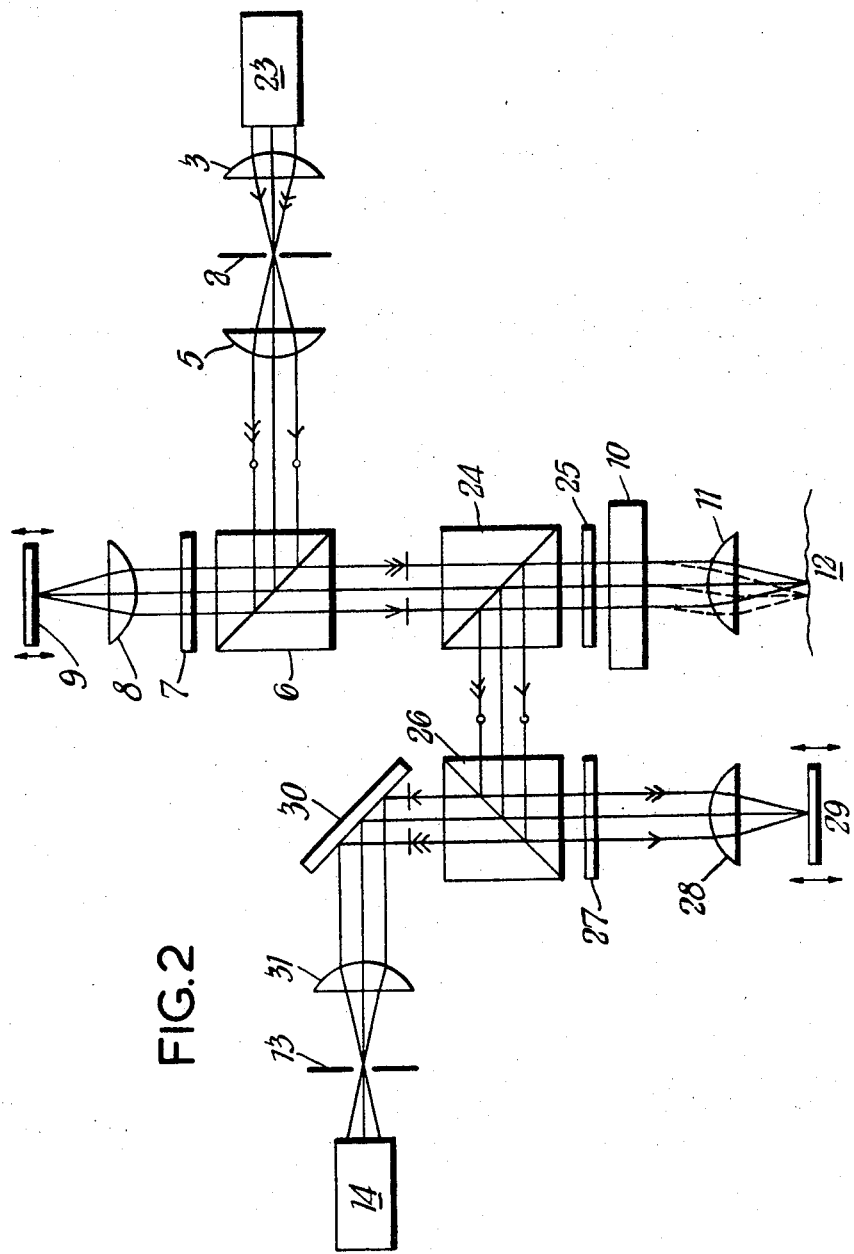
Figure 3:
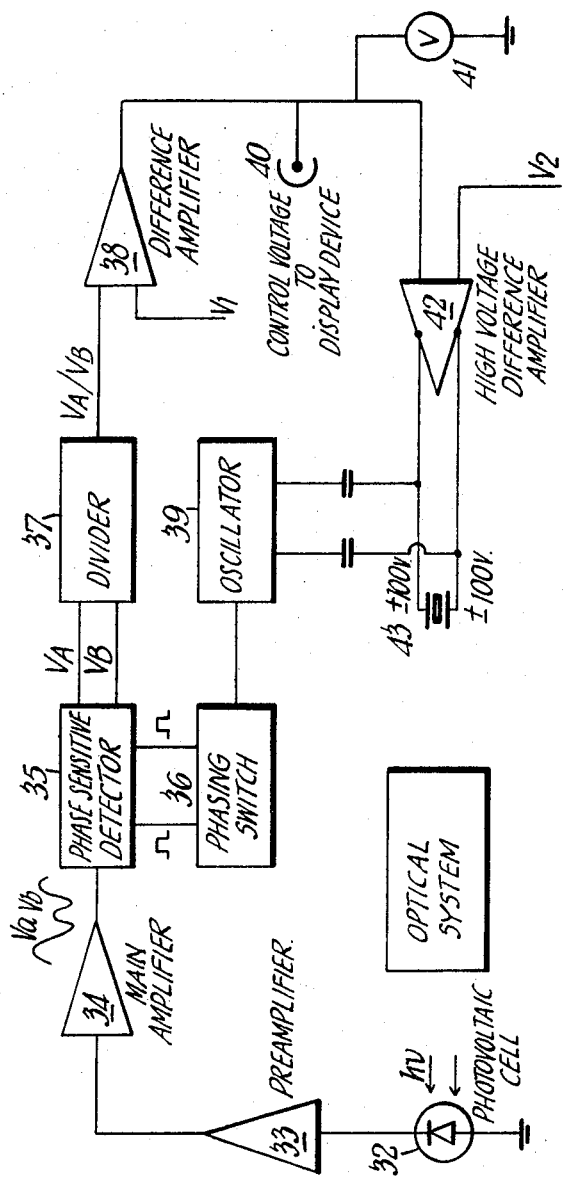

For a better understanding of the invention, and to show how it can be carried into effect, reference will now be made, by way of example, to the accompanying drawings, in which:

FIG. 3 schematically illustrates a photo-electronic 3-dimensional scanning system embodying the invention, FIG. 2 schematically illustrates part of a modification of the system, FIG. 3 is a block circuit diagram of a modification of another part of the system, and FIGS. 4a to 4e are graphs.

The system illustrated in FIG. 1 comprises a lamp 1 arranged to illuminate intensely an entrance pin-hole 2 through a condenser lens 3. The entrance pin-hole 2 serves as a point source which provides a diverging pencil of light. The diverging pencil passes through a beam splitter 4 and a telescopic doublet 5 which collimates the pencil. The collimated pencil is reflected into a vertical path by the interface of a dielectric beam splitter 6. The pencil of light is plane-polarized by the reflection so that the plane of vibration of the reflected beam is perpendicular to the plane of the drawing. The reflected beam passes through a diagonally oriented birefringent quarter-wave plate 7 and a focus-compensating objective lens 8 which serves as an intermediate objective converges the pencil towards a point focus at the reflecting surface or reflector means comprising a mirror 9 which reflects the pencil back through the focus-compensating objective lens 8 and the quarter-wave plate 7. The pencil's double transmission through the quarter-wave plate 7 causes the pencil's plane of vibration to be rotated through 90° so that on its downward path the pencil is transmitted by the interface of the beam splitter 6 with maximum intensity. On leaving the beam splitter 6 the pencil enters and X, Y scanner 10 which deflects the pencil so that it executes a repetitive 2-dimensional scan. The scanning pencil passes through a specimen objective lens 11 serving as a principal objective which focuses the pencil at a second point focus in the vicinity of the surface of a specimen 12. The pencil is reflected back through the lens 11 and the scanner 10, which removes the scanning motion from the beam, and passes back through the beam splitter 6, the quarter-wave plate 7, and the lens 8 to the mirror 9 which reflects the pencil back through the lens 8 and the quarter-wave plate 7. This second double transmission through the quarter-wave plate 7 rotates the plane of vibration of the pencil through a further 90° so that the plane of vibration is once more perpendicular to the plane of the drawing. Accordingly, the pencil is reflected with maximum intensity by the interface of the beam splitter 6 back through the telescopic doublet 5 and the beam splitter 4, which reflects the pencil towards an exit pin-hole 13. Light passing through the exit pin-hole falls upon a photodetector 14 which provides an electrical output to a high frequency amplifier 15 of electrical servo-control circuitry described below.

The optical arrangement of the apparatus is such that when the pencil is precisely focussed upon the specimen surface, the entrance and exit pin-holes are exactly conjugate with one another so that the exit pinhole 13 is illuminated with maximum intensity.

The mirror 9 comprises a piezo-electric mirror strip clamped at its two opposite ends but not at its centre so that when a voltage is applied to the mirror the centre of the mirror is deflected by an amount which depends upon the voltage. The mirror is connected to an output of a high frequency oscillator 16 and to an output of a null detector 17. The high frequency oscillator 16 serves as modulation means bringing about a cyclic variation of the state of vergence of the light pencil at a position upstream of the principal objective lens 11. By causing the centre of the mirror to vibrate with a frequency $f$ through a distance not significantly greater than the theoretical depth of focus of the two objective lenses 8 and 11 about a median position which depends upon a correcting bias voltage provided by the null detector 17, the oscillator 16 thus causes the point focus produced by the lens 11 at the surface of the specimen 12 to oscillate along the optical axis about a mean position thereon. If the correcting bias voltage is such that the pencil is pricsely focussed upon the specimen surface when the centre of the mirror is at the median position of its vibrations, the photodetector 14 detects maximum intensity when the mirror centre is at the median position. Both upward and downward displacements of the mirror centre from the median position equally reduce the intensity of the light detected by the photodetector 14 and so the photodetector delivers an output voltage having a frequency $2f$. When the scanner 10 displaces the pencil of light to a region of the specimen surface where the height is slightly different, the conjugate relationship between the two pin-holes is slightly impaired and the intensity of the light now detected by the photodetector is modulated with the fundamental frequency $f$. This change of signal is electronically processed by the null detector 17 to provide the correcting bias voltage which tends to displace the mirror centre's median position in the direction which is necessary to restore the original conjugated condition, when the fundamental frequency modulation will disappear once again.

In this manner, the mirror is caused to move in such a way as to compenate for vertical variations in the height of the specimen surface during the lateral scanning operation. The form of the correcting bias voltage faithfully follows the depth topography of the specimen surface and may be displayed by an oscilloscope or pen recorder. Alternatively, the correcting displacements of the mirror centre may be sensed by a displacement transducer whose output would be similarly displayed.

The null detector 17 employs the phase sensitive detector system. If the specimen surface is precisely at the focus of the pencil when the mirror centre is at its median position, as explained above the output of the photodetector is modulated by the frequency $2f$, the fundamental frequency modulation having disappeared. This disappearence of the fundamental frequency implies that the phase of the fundamental frequency modulation is reversed when the median position of the mirror centre is displaced from too far from the specimen surface through the desired position to too near to the specimen surface. Thus, a phase sensitive detector tuned to the fundamental frequency could determine the sense of any de-focussing drift in the median position of the mirror centre and could be arranged to apply the appropriate sign of correction to the generator of the correcting bias voltage. The reference signal for the phase sensitive detector would be obtained from the high frequency oscillator 16.

The phase reversal can be inferred from the disappearance of the fundamental frequency modulation for the following reason: When the mirror centre's median position is too high above the specimen surface, downward displacements of the mirror centre are associated with increases in the output of the photodetector, because such displacements are in the direction towards the correct height for the mirror centre's median position. This corresponds to an inverse phase relationship between the vibrations of the mirror centre and the $f$ modulation of the photodetector output. On the other hand, when the mirror centre's median position is not high enough above the specimen surface, downward displacements of the mirror centre are associated with decreases in the output of the photodetector, because such displacements are in the direction away from the correct height for the mirror centre's median position. Thus, the vibrations of the mirror contre are now in phase with the $f$ modulation of the photodetector output and the phase relationship has been reverse as compared with the previous situation.

In the drawing the position of the mirror for zero correcting bias voltage is shown by a broken line 19. The mirror centre coincides with this line when the specimen surface is at a mean height marked by a broken line 20. The maximum depth excursion which can be delineated by the illustrated apparatus depends upon the maximum deflection of the mirror 9. The upper limit for the height of an excursion is marked in the drawing by a broken line 21 (corresponding to the mirror being flexed upwards to the maximum possible extent) and the lower limit for the depth of an excursion is marked by a broken line 22 (corresponding to the mirror being flexed downwards to the maximum possible extent).

As the pencil scans over the specimen surface, local variations of the specimen surface's reflectivity will cause corresponding low frequency variations in the mean light intensity detected by the photodetector 14. The low frequency output of the photodetector may be amplified by a low frequency amplifier 18 and used to obtain a closed-circuit television display of the surface. The X and Y plates of the television tube would receive voltages which vary in synchrony with the X and Y displacements of the pencil brought about by the optical scanner 10 so as to generate a conventional raster pattern on the screen of the tube. The intensity of the electron beam would be varied by modulating the electron-beam current with the signal from the amplifier 18. This would result in an intensity-modulated image of the specimen surface in which local variations in the brightness of the image indicate corresponding local variations in the reflectivity of the specimen surface. The image would be sharply in focus regardless of whether or not the surface has depth variations which substantially exceed the theoretical depth of focus of the objective lenses.

The depth of focus of the two objective lenses depends on the depth of focus of the lens giving the restricting aperture to the optical system. Thus, if the specimen objective lens is fully illuminated, the depth of focus of the two lenses depends on the numerical aperture of the specimen objective lens.

The miror need not be actuated piezo-electrically. It could alternatively be actuated by electromagnetic, magneto-strictive or electrostatic drive means.

In the system illustrated in FIG. 1, strain birefringence in the focus-compensating objective lens 8 and elliptical polarisation, due to oblique reflection from the piezo-electrically oscillated mirror 9, may impair the quality of plane-polarisation of the pencil reflected for the first time from the mirror 9 to the polarising beam-splitter 6. Consequently, some light may be directly reflected back to the photo-detector 14 without having reached the specimen surface 12. Although light reflected from most specularly-reflecting surfaces will generally be of orders of magnitude stronger than this parasitic light component directly reflected back to the photo-detector 14, this may not be the case for some surfaces, for example surfaces of very low reflectivity.

The modified system illustrated in FIG. 2 has an optical arrangement which can be used in the examination of poorly-reflecting surfaces. Components of the FIG. 2 modification that are equivalent to those of the FIG. 1 embodiment are respectively denoted by the same reference numerals.

FIG. 2 shows a continuous-wave gas laser 23 for providing a beam of light which is focused through an entrance pinhole 2 by a lens 3. An intense point source of light is thus produced at the entrance pinhole 2 to provide a diverging pencil of light. This pencil is then collimated by a lens 5 and is subsequently reflected upwards as a plane-polarised beam by a polarising beam-splitting prism 6. The reflected beam passes through a diagonally-orientated birefringent quarter-wave plate 7 and is focused by a focus-compensating objective lens 8 onto an electrically-driven compensating mirror 9. The mirror 9 reflects the pencil back to the beam-splitter 6 through the objective lens 8 and the quarter-wave plate 7. Owing to the pencil's double transmission through the quarter-wave plate 7 (effectively acting as a half-wave plate), the pencil's plane of electrical vibration, which was originally perpendicular to the plane of the figure, is rotated through 90°. The pencil, therefore, passes directly through the polarising beam-splitter 6 and a succeeding similarly arranged beam-splitter 24. After its passage through the second beam-splitter 24, the pencil travels through a second diagonally-orientated birefringent quarter-wave plate 25 and enters a lateral scanner 10 which gives the pencil a two-dimensional scanning movement transverse to the pencil's axis. The scanning pencil is then focused by a specimen objective lens 11 onto the surface of a specimen 12. The pencil is reflected from the surface of the specimen 12 back to the second beam-splitter 24 where, owing to its double passage through the second quarter-wave plate 25 and corresponding rotation of the plane of vibration of the polarised pencil of light through 90°, the pencil is reflected to a third polarising beam-splitter 26.

After reflection by the third beam-splitter 26, the pencil is focused upon a second electrically-driven compensating mirror, reflector 29, by a second focus-compensating objective lens 28. The pencil is reflected back from the reflector 29 through the objective lens 28 towards the third beam-splitter 26. A diagonally-orientated birefringent quarter-wave plate 27 is interposed between the third beam-splitter 26 and the objective lens 28. Consequently, the pencil reflected from the reflector 29 is directly transmitted through the third beam-splitter 26, after which the pencil is directed through an exit pinhole 13 by a mirror 30 and a telescope lens 31 to a photo-detector 14.

It will be appreciated that the modified system illustrated in FIG. 2 is basically similar to the system described with referenece to FIG. 1 except insofar as the electrically-driven mirror and associated optics are duplicated. Whereas in the FIG. 2 system the mean state of dioptric vergence of the light pencil prior to modulation by the oscillating mirror 9 is restored by virtue of the pencil's second reflection at that mirror, after reflection from the specimen surface back through the lenses 11 and 8, before passing to the photodetector 14, in the FIG. 2 system the means state of vergency is restored by virtue of the pencil's reflection from the second electricially-driven oscillating mirror, i.e. the reflector 29. With the modified system the only light which can reach the photo-detector 14 is light that has been reflected from the surface of the specimen 12. The two electrically-driven mirrors 9 and 29 should be carefully matched as regards their electro-dynamic characteristics and connected in parallel with one another.

Although both the FIG. 1 and FIG. 2 systems employ entrance pinholes 2 and exit pinholes 13, these are not essential features. For example, a suitable point source could be formed by focusing light from the lamp 1 or laser 23 upon a very small metallised (for example, aluminised) spot which functions as a micro-mirror to provide a reflecting point source rather than a transmitting one. Again, each exit pinhole 13 could similarly be replaced by such a metallised spot disposed adjacent to the exit aperture of the optical arrangement. Alternatively, each exit pinhole could be replaced by a small, central opaque spot situated adjacent to the exit aperture of the optical arrangement. Such an opaque spot would function in a manner complementary to that of an exit pinhole, that is to say that the illumination at the photo-detector 14 would be a minimum, instead of a maximum, when the pencil of light reflected from the specimen surface was focused upon the spot.

FIG. 3 illustrates a modification of the electronic arrangement of the system shown in FIG. 1. Light reflected from the specimen surface through the exit pinhole 13 of FIG. 1 or 2 is arranged to fall upon a photovoltaic cell 32 whose function is analagous to that of the photo-detector 14 of FIG. 1 or 2. The output from the cell 32 is amplified by means of a preamplifier 33 succeeded by a main amplifier 34. The amplified output is delivered to a phase sensitive detector 35 connected by way of phasing switch 36 with a high-frequency oscillator 39 that provides a sinusoidal signal with a frequency of 4 kHz.

The phase sensitive detector 35 analyses the input signal it receives in such a manner as to provide output signals $V_A$ and $V_B$ which are respectively measures of the amplitudes of adjacent peaks (maxima) $V_a$ and $V_b$ in the input received by the detector 35 (see also FIGS. 4a to 4e). The signals $V_A$ and $V_B$ are delivered to respective inputs of a signal divider 37 which supplies at an output thereof a signal which is a measure of the quotient $V_A/V_B$. The quotient signal from the divider 37 is delivered to one input of a difference amplifier 38 having a second input supplied with a constant reference sigal $V_1$. The magnitude of the signal $V_1$ is chosen so that when $V_A$ is equal to $V_B$, i.e. when $V_a/V_b$ is equal to unity, a zero output signal is delivered by the difference amplifier 38. $V_1$ may for example be 1.00 volt. The difference amplifier 38 operates in such a manner, however, that when $V_A$ differs from $V_B$ an output signal is produced whose magnitude depends upon how greatly $V_A$ differs from $V_B$, i.e. upon how different the height of the peak $V_a$ is from that of the adjacent peak $V_b$ in the amplified output signal delivered by the photovoltalic cell as it receives light reflected from the specimen surface. The output signal from the difference amplifier 38 can be used as a control voltage $V_c$ for a display device 40, for example an oscilloscope, since the magnitude of the signal will be indicative of the relative position of that element of the specimen surface from which light is being reflected to the photovoltaic cell 32 at a given moment during scanning of the pencil of light over the reflecting surface of the specimen 12 (FIGS. 1 and 2). If desired, this control voltage $V_c$ can be measured directly by a voltmeter 41. The control voltage is in any case delivered to one input of the high-voltage difference amplifier 42 having a second input to which is delivered a constant reference signal $V_2$, preferably a zero signal.

The output signal from the difference amplifier 42 is used to provide a bias voltage across a PXE transducer 43 provided with a mirror strip. In addition, the PXE transducer is supplied by way of capacitors with an oscillating voltage signal from the oscillator 39 which signal is of the same frequency as that of the signal delivered to the phase sensitive detector 35. The mirror strip thus oscillates at 4 kHz. about a reference position that is determined by the magnitude of the bias voltage delivered by the difference amplifier 42. The optical system effective between the photovoltaic cell 32 and the transducer 43 is schematically denoted in FIG. 3 as a block 44.

As the pencil of light is scanned over the specimen surface, the magnitude of the bias voltage delivered by the difference amplifier 42 at any time changes in such a way that the reference position about which the mirror strip oscillates is accordingly altered so that the focus of the pencil tends to oscillate centrally about the position of that element of the specimen surface onto which the pencil of light is momentarily falling. This has the effect of tending to equalize the magnitudes of the peaks $V_a$ and $V_b$.

It will be appreciated that the arrangement illustrated in FIG. 3 comprises a servo system that operates in dependence upon a signal representative of $V_A/V_B$ and thus of $V_aV_b$. Alternatively, it would be possible to employ a servo system that responds to a signal representative of the arithmetic difference between $V_a$ and $V_b$. However, the loop gain of such an alternative system would be dependent on the absolute amplitude of the difference signal. Thus as the amplitude of this difference signal would vary with the reflectivity of the specimen surface, loop gain, band-width and stability would not be readily optimisable. With the arrangement illustrated in FIG. 3, on the other hand, where the divider 37 is employed to provide a signal representative of $V_a/V_b$, servo operation is independent of such variation in reflectivity.

Instead of the arrangement illustrated in FIG. 3, an arrangement with automatic gain control could be employed which would give similar results. The use of such gain control, however, would introduce another feedback loop with its own gain, band-width and stability problems.

If the arrangements is such that the focus of the pencil of light at the specimen moves axially by a distance $p$ as the pencil of light is scanned from a first element of the specimen surface to a second element that is axially displaced from the first by a distance $s$, the error will be equal to $s-p$. For small changes, V is approximately equal to $k_1(s-p)$, where $k_1 = dV/d(s-p)$ at V=1, V being the quantity $V_A/V_B$, the output signal from the divider 37. The control voltage $V_c$ will be given by $V_c = AV$, where A is the characteristic of the difference amplifier 38. Accordingly, the movement $p$ of the focus will be given by $p = k_2V_c$, where $k_2$ is a factor whose magnitude depends upon the characteristics of the amplifier 42 and the transducer 43. As a percentage, therefore, the error of the system is given by $$\text{percent error} = \frac{100(s-p)}{S} \simeq \frac{100(s-p)}{p} = \frac{100}{k_1 k_2 A}$$

So for 1% error, $k_1k_2A$ equals 100.

For optimum band-width A should be no larger than circumstances dictate. A can be adjusted after determination of $k_1$ and $k_2$, which can be effected for example by measuring transducer movement for a given movement of the specimen surface with no optical feedback operating.

It can be shown that when $V_A \simeq V_B$ then $dV/dx \simeq 2$, where V, equal to $V_A/V_B$, is expressed as $(1+x)/(1-x)$. Thus in the arrangement illustrated in FIG. 3, with $V_1$ equals 1 volt, $dV/dx \simeq 0.02$ volt per percentage change in $V_A$ or $V_B$.

In an arrangement with servo operation dependent upon the difference between $V_a$ and $V_b$ and thus between $V_A$ and $V_B$ there would be a null when $V_A$ equals $V_B$. In this case, taking V as $V_A - V_B$, and writing $(V_A + V_B)/2 = A_0$, the amplitude, it can be shown that $dV/dx$ equals $2A_0$. Thus both servo systems have equal sensitivity when $A_0 = 1$ volt. The arithmetic difference system will be more sensitive for $A_0 >$ one volt and less sensitive for $A_0 <$ one volt.

The graphs of FIGS. 4a to 4e illustrate the general nature of the variation with time $t$ of the output signal $V_0$ from the photo-detector 14 of FIG. 1 or 2 or from the photovoltaic cell 32 of FIG. 3 as the focus of the pencil of light oscillates about an element of the specimen surface that is in various positions relative to the centre of oscillation of the focus. The ordinates of the graphs are not to be considered as necessarily being to the same scale. Also, it is supposed that the greater the intensity of light arriving at the surface element, the less the output from the photo-detector 14 or the photovoltaic cell 32, as the case may be.

Figure 4A:
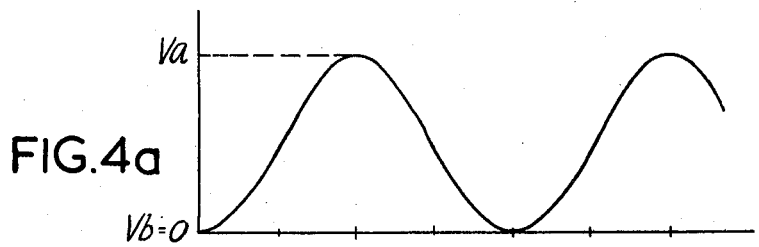

FIG. 4a shows the situation when the element of the specimen surface is at the upper limiting position of the focus, e.g. on the line 21 of FIG. 1. At the start of a complete oscillation it is supposed that the element and the focus coincide. Then the light received at the element will be of maximum intensity and so the output from the photo-detector or cell is a minimum, shown arbitrarily as zero in FIG. 4a. As the focus descends, the intensity of light at the element diminishes until, when the focus is in its lower limiting position after half a complete oscillation, the light intensity at the element is a minimum and thus the output signal $V_0$ is at the maximum. As the focus rises again during the latter half of a complete oscillation, the light intensity at the element increases until, when the focus again coincides with the element at the end of the oscillation, the intensity is once more at maximum and V is accordingly at minimum. The difference $V_a - V_b$ in height between adjacent peaks of the output signal $V_0$ is in this case a maximum.

Figure 4B:
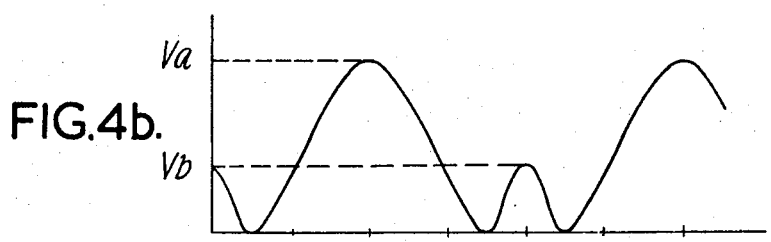

FIG. 4b shows the situation when the element is disposed between the upper limiting position of the focus and its centre of oscillation, e.g. between the lines 20 and 21 of FIG. 1. As the focus descends from its upper limiting position, the light intensity reaches a maximum during the first quarter of the oscillation and then falls to a minimum after half of the oscillation has been completed. Thus the output signal $V_0$ falls to a minimum during the first quarter of the oscillation and rises to a maximum at the halfway point in the oscillation. As the focus is brought up from its lower limiting position the light intensity at the element rises until during the last quarter of the oscillation it reaches a maximum, after which the intensity falls off a little as the focus travels to the upper limiting position. Accordingly, the output signal $V_0$ falls from a maximum at the half-way point of the oscillation to a minimum occurring during the last quarter of the oscillation, after which occurrence the signal amplitude rises a little as the oscillation is completed. In this case, the difference $V_a - V_b$ between adjacent peaks is not a maximum.

Figure 4C:
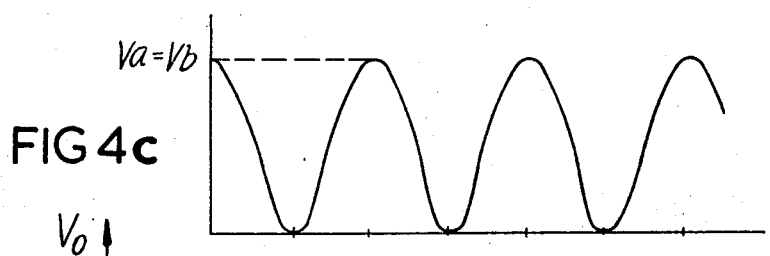

FIG. 4c shows the situation when the position of the element coincides with the centre of oscillation of the focus, e.g. on the line 20 of FIG. 1. When the focus is in its upper and lower limiting positions, the light intensity at the element is a minimum and the output signal $V_0$ is accordingly a maximum. Whenever the focus coincides with the element, which it does every half oscillation of the focus, the light intensity at the element is a maximum and, accordingly, the output signal $V_0$ is a minimum. Thus the frequency of the output signal $V_0$ is exactly twice the frequency of oscillation of the focus. In this case adjacent peaks are of the same amplitude and so $V_a - V_b = 0$.

Figure 4D:
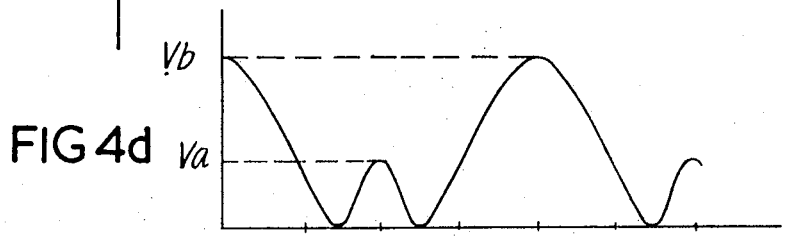

FIG. 4d shows the situation when the element lies between the lower limiting position of the focus and its centre of oscillation, e.g. between the lines 20 and 22 of FIG. 1. At the start of an oscillation, the focus is at its most distant from the element, so that light intensity at the element is a minimum whereas the output signal $V_0$ is a maximum. As the focus travels down, the light intensity increases until, in the course of the second quarter of the oscillation the focus coincides with the element which is thus illuminated with maximum intensity and, accordingly, the output signal $V_0$ is at minimum. As the focus descends further, the light intensity at the element falls off until, after the focus has been through its lower limiting position, the intensity rises again. In the course of the third quarter of the oscillation, the focus again coincides with the element, so the light intensity is again at maximum and, correspondingly, the output signal $V_0$ has a minimum at this point. For the remainder of the oscillation, the light intensity at the element steadily falls as the focus moves upwards to its upper limiting position, which it reaches at the end of the oscillation. Thus the output signal $V_0$ rises to a maximum at the end of the oscillation. In this case, $V_b$ is greater than $V_a$.

Figure 4E:
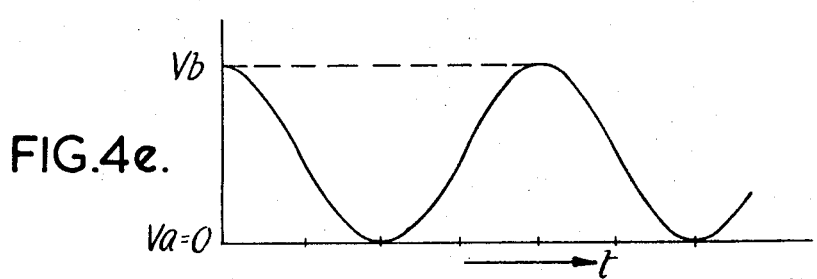

FIG. 4e shows the situation when the element is in the lower limiting position of the focus, e.g. on the line 22 of FIG. 1. As the focus travels down from its upper limiting position, the light intensity at the element increases steadily until, when after half an oscillation the focus coincides with the element, the intensity is at a maximum. There is correspondingly a drop in the output signal $V_0$ from a maximum initially to a minimum after half of the oscillation of the focus. During the remaining half of the oscillation, the light intensity steadily falls from its maximum value until, when the focus is once more in its upper limiting position at the end of the oscillation, it is at a minimum again. Accordingly, during this latter half of the oscillation, the output signal $V_0$ rises steadily from a minimum to a maximum. In this case, the difference $V_a - V_b$ in height of adjacent peaks has its largst negative value.

From comparison of FIG. 4a with FIG. 4e, or of FIG. 4b with FIG. 4d, it will be apparent that, in accordance with what has been mentioned above in connection with the FIG. 1 embodiment, the variation with focus position of the light intensity at the specimen, and hence of the output signal $V_0$ from the photo-detector 14 or photo-voltaic cell 32, differs in phase by 180° on opposite sides of the centre of oscillation of the focus.

Although FIGS. 1 and 2 both include a lateral scanner 10, it will be appreciated that an embodiment of the invention not incorporating such a scanner could be employed for measuring the proximity of a reflecting surface.

In describing FIG. 1 of the drawings, it was assumed above that 18 represents a low-frequency amplifier. Alternatively, however, 18 could be taken as an electronic arrangement incorporating a gate which opens when the output from the photodetector 14 has a peak value so as to allow transmission of a corresponding pulse to a suitable display system also incorporated in this electronic arrangement. As the pencil of light is scanned over the specimen surface while the focus oscillates, a continuous pulse train will thus be produced. This train can be employed by the display system to provide a representation of the specimen surface.

I claim:

1. Apparatus for investigating the topography of a reflecting surface comprising:
   (a) optical means, defining an optical axis, for directing a pencil of light along said optical axis onto an element of said reflecting surface, said optical means including:
      (i) an intermediate objective for converging said light pencil to an intermediate point focus,
      (ii) reflector means providing a reflecting surface disposed in the vicinity of said intermediate point focus, and controllably displaceable along said optical axis, to reflect said pencil back through said intermediate objective, and
      (iii) a principal objective disposed to receive the pencil from the intermediate objective, after reflection from the reflecting surface of said reflector means, and bring it to a second point focus in the vicinity of said element;
   (b) modulation means controllingly with said optical means and operable to bring about dioptrically a cyclic variation of the state of vergence of said pencil, at a position upstream of said principal objective, to cause said second point focus to oscillate along said optical axis about a mean position thereon; and
   (c) photoelectronic means, including:
      (i) a photodetector mounted to receive said light, after reflection back from said element through said principal objective, for providing an electrical output in dependence upon the amount of said light received by the photodetector, and
      (ii) electrical servocontrol means, connected between said photodetector and said reflector means, for operating in dependence upon said electrical output to provide an electrical signal which controls displacement of the reflecting surface of said reflector means to bring the said mean position towards coincidence with said element.

2. Apparatus as claimed in claim 1, wherein said pencil passes after reflection back from said element through said principal objective, through said intermediate objective to be reflected a second time back from the reflecting surface of said reflector means through said intermediate objective before reaching said photodetector, thereby causing said pencil's mean state of dioptric vergence following its second reflection from the reflecting surface of said reflector means to be substantially the same as the pencil's mean state of dioptric vergence prior to its first reflection at the reflecting surface of said reflector means.

3. Apparatus as claimed in claim 1, wherein said optical means further include a reflector from which said pencil is reflected, after reflection back from said element through said principal objective, before reaching said photodetector, said reflector being adapted to be displaced so as to cause said pencil's mean state of dioptric vergence following reflection at said reflector to be substantially the same as the pencil's mean state of dioptric vergence prior to its reflection at the reflecting surface of said reflector means.

4. Apparatus as claimed in claim 1, wherein said reflector means comprise a piezo-electric body provided with a reflecting surface which constitutes the reflecting surface of said reflector means, said modulation means being adapted to apply an oscillatory electrical signal to said body to cause oscillation of the said surface portion along said optical axis to bring about the oscillation of said second point focus.

5. Apparatus as claimed in claim 1, wherein said modulation means comprise electromagnetic, magetostrictive or electrostatic drive means for causing the reflecting surface of said reflector means to oscillate to bring about the oscillation of said second point focus.

6. Apparatus as claimed in claim 1, wherein said optical means include a converging lens and a beam-splitting device arranged to convey light directed by the lens from a point source to the reflecting surface of said reflector means by way of said beam-splitting device so as to be reflected from the reflecting surface of said reflector means by way of said beam-splitting device towards said principal objective.

7. Apparatus as claimed in claim 6, wherein said optical means include a further beam-splitting device arranged to convey to the photodetector light reflected from said element to the reflecting surface of said reflector means by way of the first-mentioned beam-splitting device and then reflected from that reflecting surface by way of said first-mentioned beam-splitting device to said further beam-splitting device.

8. Apparatus as claimed in claim 7, wherein said intermediate and principal objectives respectively comprise two converging lenses respectively arranged between the reflecting surface of said reflector means and said first-mentioned beam-splitting device and between said first-mentioned beam-splitting device and said second point focus, the first-mentioned converging lens being disposed between said first-mentioned beam-splitting device and said further beam-splitting device so as to receive light from said point source by way of said further beam-splitting device.

9. Apparatus as claimed in claim 8, wherein said first-mentioned beam-splitting device is such that light reflected therefrom is plane-polarized, the optical means including a quarter-wave plate arranged between the reflecting surface of said reflector means and said first-mentioned beam-splitting device.

10. Apparatus as claimed in claim 6, wherein said optical means include a second beam-splitting device arranged, between the first-mentioned beam-splitting device and said second point focus, to convey to said element light reflected from the reflecting surface of said reflector means, a third beam-splitting device arranged to convey light reflected from said element by way of said second beam-splitting device, and a reflector arranged to reflect light conveyed thereto from said element by way of said third beam-splitting device towards the photodetector by way of the third beam-splitting device, said reflector being adapted to be displaced so as to cause said pencil's mean state of dioptric vergence following reflection at said reflector to be substantially the same as the pencil's mean state of dioptric vergence prior to its reflection at the reflecting surface of said reflector means.

11. Apparatus as claimed in claim 10, wherein said intermediate and principal objectives respectively comprise two converging lenses respectively arranged between the reflecting surface of said reflector means and said first mentioned beam-splitting device and between said second beam-splitting device and said second point focus, said optical means including a further converging lens arranged between said third beam-splitting device and said reflector.

12. Apparatus as claimed in claim 11, wherein said optical means include an auxiliary converging lens arranged to direct towards the photodetector light reflected from said reflector by way of said third beam-splitting device.

13. Apparatus as claimed in claim 12, wherein said first-mentioned beam-splitting device and said second and third beam-splitting devices are such that light reflected therefrom is plane-polarized, there being three quarter-wave plates respectively arranged between the reflecting surface of said reflector means and said first-mentioned beam-splitting device, between said second beam-splitting device and said second point focus, and between said reflector and said third beam-splitting device.

14. Apparatus as claimed in claim 1, wherein said servo control means include an electronic gate arranged to open upon peaking of the output from the photodetector.

15. Apparatus as claimed in claim 1, wherein said servo control means are adapted to operate in dependence upon change in frequency of the output from the photodetector.

16. Apparatus as claimed in claim 15, wherein said servo control means include a phase sensitive detector connected to receive the output from the photodetector.

17. Apparatus as claimed in claim 16, wherein the phase sensitive detector is adapted to deliver respective signals proportional to the amplitudes of adjacent peaks in the output from the photodetector, said servo control means further including signal divider means connected to recieve said signals and deliver a signal proportional to the quotient of said amplitude, and differential amplifier means connected respectively to receive the quotient-proportional signal and a constant reference signal and deliver a signal, constituting the electrical signal controlling displacement of the reflecting surface of said reflector means, which is dependent upon the difference between said constant reference signal and said quotient-proportional signal.

18. Apparatus as claimed in claim 1, wherein said optical means include a scanning device for successively directing said pencil of light onto a plurality of such elements of the reflecting surface under investigation so that said servo control means provide an electrical signal which controls displacement of the reflecting surface of said reflector means to bring the said mean position towards coincidence with that one of said elements onto which the pencil is momentarily being directed.

19. Apparatus as claimed in claim 18, including a display device which is connected to receive the electrical signal controlling displacement of the reflecting surface of said reflector means and is adapted to employ amplitude variation thereof to provide a representation of the reflecting surface under investigation as said pencil of light is scanned over such elements thereof.

20. Apparatus as claimed in claim 19, wherein said display device is adapted to employ the electrical signal controlling displacement of the reflecting surface of said reflector means for intensity-modulating an electron beam which is scanned over a display screen of the display device in synchrony with the scanning of said pencil of light over the reflecting surface under investigation.

References Cited
UNITED STATES PATENTS

| | | | |
|---|---|---|---|
| 3,606,541 | 9/1971 | Sugano et al. | 356—120 |
| 3,520,607 | 7/1970 | Zoot | 356—167 |
| 3,481,672 | 12/1969 | Zoot | 356—167 |
| 3,589,815 | 6/1971 | Hosterman | 356—120 |
| 3,506,839 | 4/1970 | Ando et al. | 250—232 |
| 3,385,159 | 5/1968 | Bliss et al. | 250—235 |
| 3,512,868 | 5/1970 | Gorkiewicz et al. | 350—157 |

RONALD L. WIBERT, Primary Examiner

V. P. McGRAW, Assistant Examiner

U.S. Cl. X.R.

250—219 DF; 356—167, 209